(12) United States Patent
Sasakawa

(10) Patent No.: US 8,184,865 B2
(45) Date of Patent: May 22, 2012

(54) METHOD AND APPARATUS FOR PRODUCING LAND-SURFACE IMAGE DATA

(75) Inventor: Tadashi Sasakawa, Tokyo (JP)

(73) Assignee: Pasco Corporation, Tokyo (JP)

( * ) Notice: Subject to any disclaimer, the term of this patent is extended or adjusted under 35 U.S.C. 154(b) by 115 days.

(21) Appl. No.: 12/678,873

(22) PCT Filed: Jun. 9, 2009

(86) PCT No.: PCT/JP2009/002590
§ 371 (c)(1), (2), (4) Date: Mar. 18, 2010

(87) PCT Pub. No.: WO2010/106583
PCT Pub. Date: Sep. 23, 2010

(65) Prior Publication Data
US 2011/0064280 A1 Mar. 17, 2011

(30) Foreign Application Priority Data

Mar. 18, 2009 (JP) ................................ 2009-066771

(51) Int. Cl.
*G06K 9/00* (2006.01)

(52) U.S. Cl. ..................................... 382/113
(58) Field of Classification Search .................. 382/108, 382/113, 190, 195, 203
See application file for complete search history.

(56) References Cited

U.S. PATENT DOCUMENTS 6,920,233 B2 * 7/2005 Wolfson et al. ............... 382/100
(Continued)

FOREIGN PATENT DOCUMENTS

JP 2000-322562 A 11/2000
(Continued)

OTHER PUBLICATIONS

Tseng D C et al; Automatic cloud removal from multi-temporal SPOT images, Applied Mathematics and Computation, Elsevier, US, vol. 205, No. 2, Nov. 15, 2008, pp. 584-600, XP025585196, ISSN: 0096-3003, DOI: 10.1016/J. AMC. 2008.05.050. *figure 1, * p. 588 sec. 3, "Cloud and cloud-shadow determination" *p. 591, sec. 4, "Image fusion".

(Continued)

*Primary Examiner* — Phuoc Tran
(74) *Attorney, Agent, or Firm* — Apex Juris, pllc; Tracy M. Heims

(57) ABSTRACT

An object of the invention is to provide a method and an apparatus for producing land-surface image data, which can correct, with relatively high accuracy, cloud image data included in satellite image data into land-surface image data that would emerge in the absence of a cloud. Geostationary satellite image data 1 of a predetermined time at a production standard date is obtained, and a determination whether each pixel is a pixel reflecting a land surface 4 or a pixel reflecting a cloud 5 is made to set partial image data 6 and a missing region 7. Then, processing is repeated by sequentially adding another imaging date and time according to a predetermined priority until the missing region 7 is filled up with the pixel determined to be the pixel reflecting the land surface 4, thereby producing interpolated image data 9 to produce the land-surface image data. The pixel is determined to be the pixel reflecting the land surface 4 from a pixel value in the another imaging date and time that is determined to be data having a close temporal relevance in a relationship between a solar position and the predetermined time of the production standard date.

5 Claims, 7 Drawing Sheets

U.S. PATENT DOCUMENTS

| | | | |
|---|---|---|---|
| 7,693,702 B1 * | 4/2010 | Kerner et al. | 703/22 |
| 2002/0041328 A1 * | 4/2002 | LeCompte et al. | 348/144 |
| 2005/0175253 A1 | 8/2005 | Li et al. | |

FOREIGN PATENT DOCUMENTS

| | | |
|---|---|---|
| JP | 2001-143054 A | 5/2001 |
| WO | 2004/057531 A1 | 7/2004 |

OTHER PUBLICATIONS

Gabarda et al; "Cloud covering denoising through image fusion", Image and Vision Computing, Elsevier, Guildford, GB, vol. 25, No. 5, Feb. 21, 2007, pp. 523-530, XP005897132, ISSN: 0262-8856, DOI: 10.1016/J.IMAVIS.2006.03.007 *p. 525, left-hand column—right-hand column, paragraph 1.

* cited by examiner

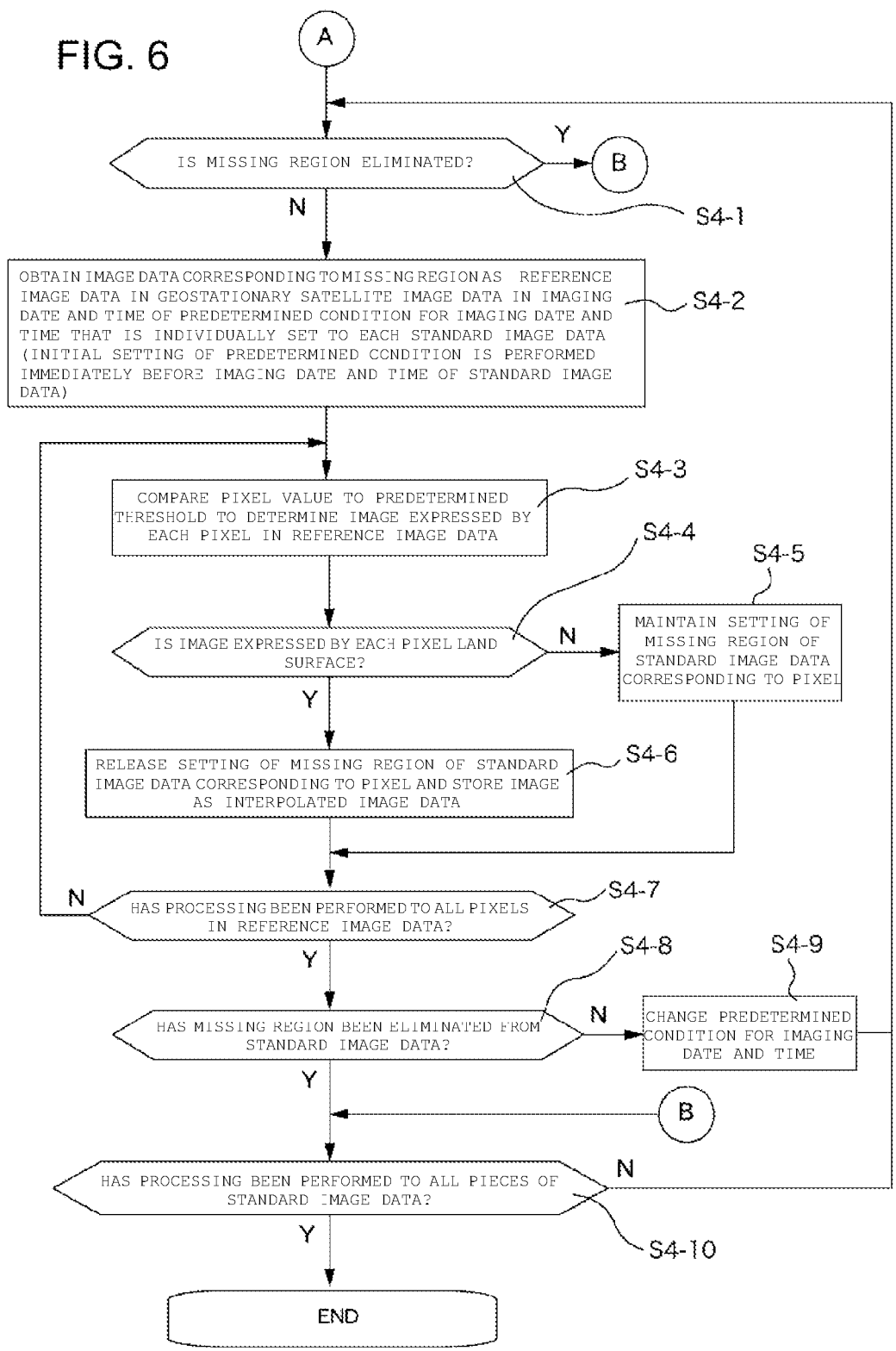

METHOD AND APPARATUS FOR PRODUCING LAND-SURFACE IMAGE DATA

TECHNICAL FIELD

The present invention relates to a method and an apparatus for producing land-surface image data.

BACKGROUND ART

Conventionally, for example, in a technique disclosed in Patent Document 1, cloud image data that is taken so as to partially hide land-surface image data in satellite image data is removed and corrected into the land-surface image data that would emerge in the absence of a cloud. In the conventional technique, a satellite image including a cloud image and a reference image in which the same region as the satellite image is taken without including the cloud image are prepared and, based on a relational expression of a DN (Digital Number) value between the images, a land-surface image that replaces the cloud image is computed from the DN value of the region corresponding to the cloud image in the reference image in consideration of land-cover classification.

Patent Document 2 discloses processing in which pixel density values of the land-surface image and the cloud image, included in the same satellite image, are compared to reduce the pixel density value of the cloud image.

Patent Document 1: Japanese Patent Application Laid-Open No. 2001-143054

Patent Document 1: Japanese Patent Application Laid-Open No. 2001-322562 (page No. 2)

However, in the conventional techniques, because a shadow is not considered, accuracy of the land-surface image data that replaces the cloud image data disadvantageously tends to deteriorate.

That is, a generation status of the shadow largely changes depending on a time of the day, a solar position that is changed according to a period of time, and an irregular state of a land surface. For example, in the case of the irregular land surface, the shadow becomes large and small with time, and the position of the shadow is also changed. On the other hand, in the case of the flat land surface, the shadow is not generated in principle irrespective of the solar position. In the conventional techniques, in order to obtain the land-surface image data that replaces the cloud image data, a pixel value at a different time is simply referred to or a pixel value in a different point is referred to. Therefore, there is a risk of deteriorating the accuracy of obtained land-surface image data due to the shadow changed by the time of the day or the difference of the point.

DISCLOSURE OF THE INVENTION

The present invention has been made to solve the foregoing problem, and an object of the invention is to provide a method and an apparatus for producing land-surface image data, which can correct, with relatively high accuracy, the cloud image data included in the satellite image data into the land-surface image data that would emerge in the absence of the cloud in consideration of the shadow.

According to an aspect of the invention, there is provided a land-surface image data producing method that is performed after a production standard date is set, the method including, successively: referring to an image database 2 that is stored while imaging date and time data is correlated with geostationary satellite image data 1 and obtaining a predetermined region of the geostationary satellite image data 1 at a predetermined time in the production standard date as standard image data 3; comparing a pixel value and a predetermined threshold to determine whether each pixel of the standard image data 3 reflects a land surface 4 or a cloud 5, extracting a pixel that is determined to be the pixel reflecting the land surface 4 and storing the pixel as partial image data 6, and setting a region on the standard image data 3 specified by remaining pixels as a missing region 7; referring to the image database 2 to obtain image data as reference image data 8, the image data corresponding to the missing region 7 in geostationary satellite image data 1 of another imaging date and time, which is determined to be geostationary satellite image data 1 having a close temporal relevance in a relationship between a solar position and the predetermined time at the production standard date according to a predetermined criterion, comparing a pixel value of each pixel of the reference image data 8 to a predetermined threshold, determining whether the pixel value reflects the land surface 4 or the cloud 5, repeating the processing by sequentially adding the another imaging date and time according to a predetermined priority until the missing region 7 is filled up with the pixel determined to be the pixel reflecting the land surface 4, and producing interpolated image data 9 that is formed by filling up the missing region 7 with the pixel determined to be the pixel reflecting the land surface 4; and synthesizing the partial image data 6 and the interpolated image data 9 to produce land-surface image data.

In the aspect of the invention, the cloud image data 5 in the standard image data 3 is replaced with the land-surface image data 4 in the reference image data 8. In the imaging date and time of the reference image data 8, the timing at which there is the close temporal relevance in the relationship between the solar position and the imaging date and time of the standard image data 3, is selected. The land-surface image data 4 in the reference image data 8 that replaces the cloud image data 5 in the standard image data 3 is obtained from the region corresponding to the cloud image data 5 of the standard image data 3 in the reference image data 8.

Accordingly, the land-surface image data 4 that replaces the cloud image data 5 is imaged in the solar position close to the solar position in which the replaced cloud image 5 is imaged, and the land-surface image data 4 is an image in the same point as the cloud image 5. Therefore, the generation status of the shadow is substantially common in the land-surface image data 4 and the cloud image data 5, and the land-surface image data 4 that replaces the cloud image data 5 can be matched, with extremely high accuracy, with the land-surface image that would emerge in the absence of the cloud.

The geostationary satellite image data 1 is used as the standard image data 3 and the reference image data 8. Because a position of the geostationary satellite relative to the imaging spot is not changed, an imaging direction with respect to the imaging spot can always be kept constant when the imaging spot is taken from the geostationary satellite. When the imaging direction with respect to the imaging spot is kept constant, the temporal flexibility can be enhanced, for example, the image can be repeatedly taken in an extremely short time compared with an orbiter under the imaging condition that only the time is changed. For example, the image can be taken in a short time under the condition that the solar position is not largely changed, such that the image is repeatedly taken in a short time interval such as one hour or less, or such that the image is taken at the same time in the successive days.

In the standard image data 3, the solar position can be specified more correctly by specifying the imaging date and time with a predetermined time, that is, in units of hours or minutes. At this point, when the culmination time in the imaging region of the standard image data 3 is used as the predetermined time, even if the land surface is irregular in the imaging region, the shadow is prevented from being generated on the image, so that the land surface can be recognized more correctly. As conceptually illustrated in FIG. 4, when the image is taken at the culmination time from the geostationary satellite, an arrangement of the imaging region, the geostationary satellite, and the sun is brought close to a straight line, which allows the land surface to be imaged with optimum accuracy while the shadow is avoided. In FIG. 4, the numeral 30 designates the land surface, the numeral 31 designates the cloud, the numeral 32 designates the sun, the numeral 33 designates a locus of the sun, and the numeral 34 designates the geostationary satellite.

As with the conventional technique, the determination of the cloud image data 5 in the standard image data 3 may be made by comparing the pixel value to the predetermined threshold. As with the conventional technique, the threshold may be determined as appropriate.

When the imaging region of the standard image data 3 covers the wide longitude, the culmination time can be determined based on the longitude in the center position of the imaging region. Alternatively, a predetermined region where the culmination time can be determined on the geostationary satellite image data 1 may be carved from the standard image data 3. When the plural pieces of standard image data 3 are correlated with one another, the mixed geostationary satellite image data 1 that covers the wider longitude can be obtained while the accuracy is maintained as illustrated in FIG. 3.

On the other hand, the reference image data 8 is obtained based on a possibility that the reference image data 8 differs from the standard image data 3 in the imaging timing to obtain the land-surface image data 4 in the region corresponding to the cloud image data 5 of the standard image data 3 due to the movement of the cloud. The reference image data 8 is obtained using the geostationary satellite image data 1 of the region corresponding to the cloud image data 5 of the standard image data 3. In the reference image data 8, for example, the imaging timing is delayed 15 minutes with respect to the standard image data 3 according to the minimum imaging time interval of the geostationary satellite. As with the standard image data 3, the determination whether the pixel is the land-surface image data 4 or the cloud image data 5 is made in each pixel in order to make a determination whether the land-surface image data 4 of the region corresponding to the cloud image data 5 is obtained or not from the reference image data 8, and the pixel corresponding to the land surface is adopted as a replacement for the cloud pixel of the standard image data 3. Accordingly, when the cloud image data 5 is included, the land-surface image data 4 consisting of the pixels corresponding to the cloud image data 5 is not obtained. In such cases, new another piece of reference image data 8 is obtained to try to obtain the land-surface image data 4 consisting of the pixels.

A priority in determining the reference image data 8, that is, a priority of the imaging date and time of the reference image data 8 is previously set because the plural pieces of reference image data 8 are occasionally required. The priority can appropriately be set in consideration of: the timing at which the solar position is not largely different from that at the imaging date and time of the standard image data 3; the timing at which the cloud 5 included in the standard image data 3 can be expected to be moved; and the like. For example, in consideration of the current minimum imaging time interval of the geostationary satellite, a time that is closest to the imaging time of the standard image data 3 is set to a first priority, the same time in a date that is closest to the imaging date of the standard image data 3 is set to a second priority, and a time that is closest to the same time is set to a third priority. When the standard image data 3 is of the latest imaging date and time in the image database 2, the priority is limited only to the past imaging dates and times. When the imaging date and time is later than the standard image data 3, one of the imaging date and time and the standard image data 3 may be set so as to have the higher priority than the other. When the pieces of standard image data 3 having the different imaging dates and times are coupled as described above, the accuracy can be maintained by preparing the plural pieces of reference image data 8 having the different imaging dates and times in consideration of the imaging dates and times of the pieces of standard image data 3.

As described above, the invention can provide the method and apparatus for producing the land-surface image data, which can correct, with relatively high accuracy, the cloud image data included in the satellite image data into the land-surface image data that would emerge in the absence of the cloud in consideration of the shadow. Additionally, the advantages of the wide-area image and the easiness of repetition of the geostationary satellite image can be utilized to well recognize the land surface without losing the advantage of simultaneity.

BRIEF DESCRIPTION OF THE DRAWINGS

FIG. 6 is a detailed flowchart of a step for obtaining reference image data and setting interpolated image data.
FIG. 7 is a view illustrating pieces of geostationary satellite image data having different imaging times, wherein

BEST MODE FOR CARRYING OUT THE INVENTION

Figure 1:
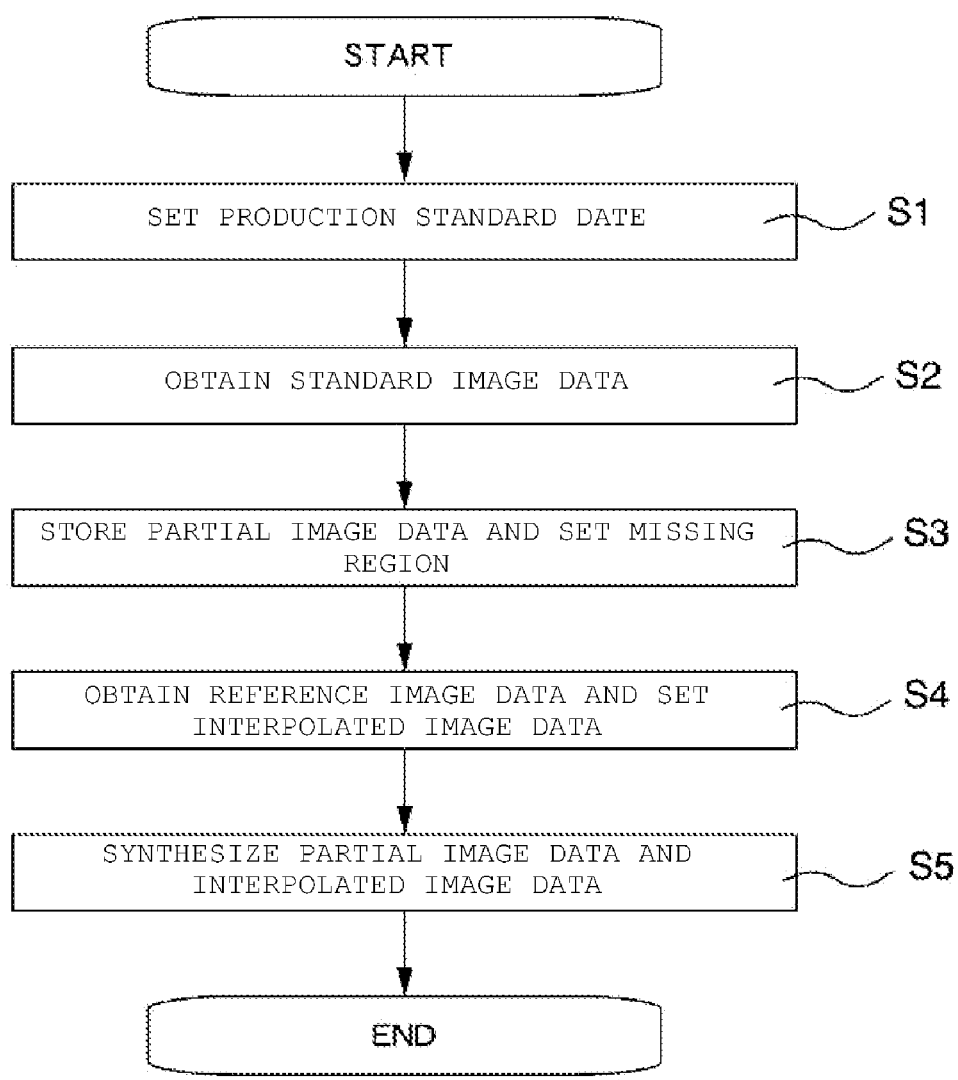
FIG. 1 is a flowchart of the invention.
Figure 2:
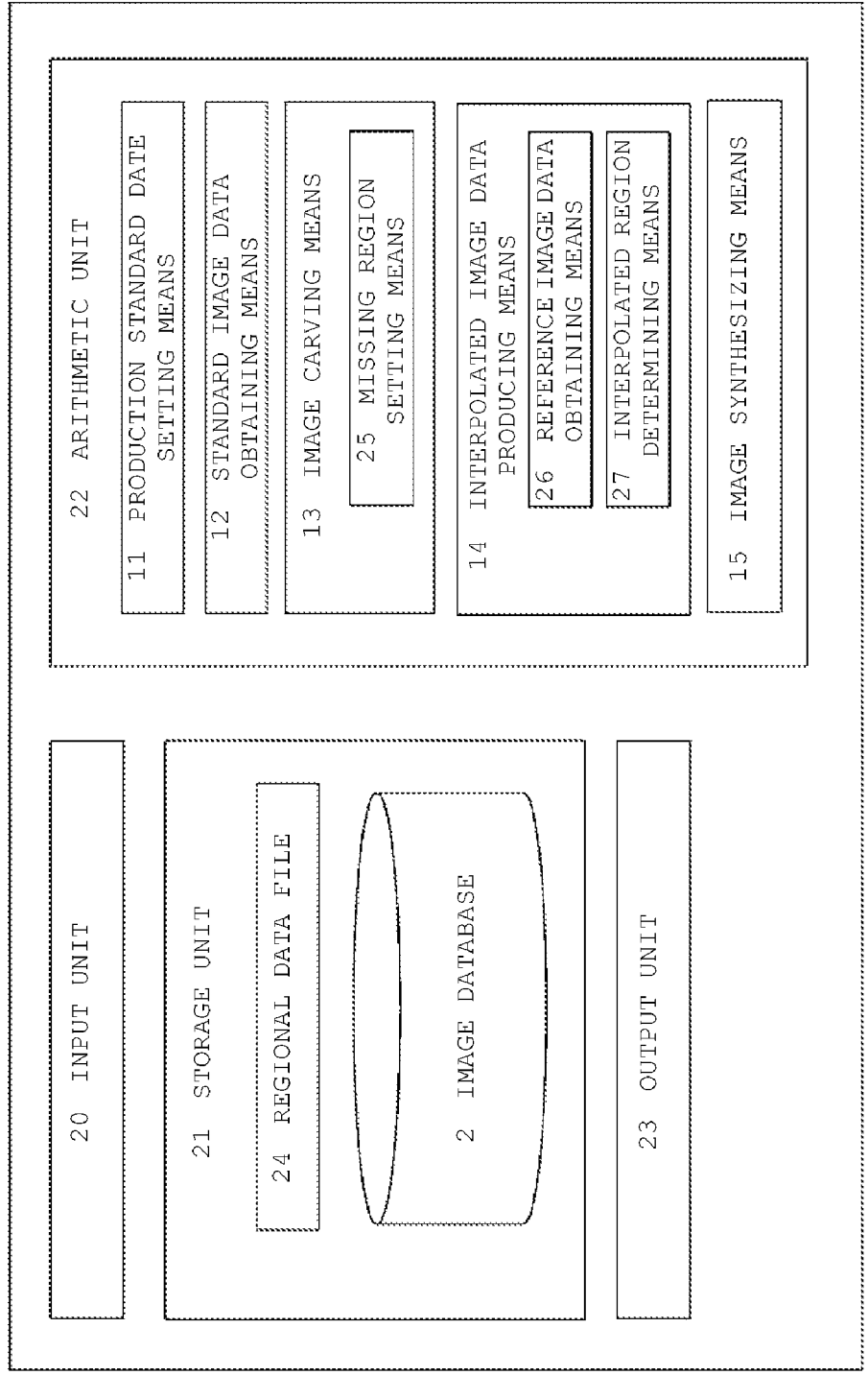
FIG. 2 is a block diagram of the invention.

FIG. 1 illustrates a whole processing procedure for producing land-surface image data according to an embodiment of the invention, and FIG. 2 is a block diagram illustrating a computer that performs the processing procedure of FIG. 1. The computer includes a mouse and a keyboard (not illustrated), a recording medium reading device, an input unit 20 that includes an interface with the Internet and the like, a storage unit 21 in which an image database 2 is stored, an arithmetic unit 22, and an output unit 23 that outputs the arithmetic result to a monitor (not illustrated). Pieces of geostationary satellite image data 1 obtained from Japan Weather Association and the like through the input unit 20 are accumulated in the image database 2. In the image database 2, the geostationary satellite image data 1 can be searched at an imaging date and time by imaging date and time data that is obtained along with the geostationary satellite image data 1.

The pieces of geostationary satellite image data 1, 1, that are images at intervals of, for example, 15 minutes according to an imaging time interval of the geostationary satellite are accumulated in the image database 2 for a period of several years. In the geostationary satellite image data 1, a latitude and a longitude in any position on the image can be specified by pieces of coordinate data of the latitude and longitude, which are obtained as so-called annotation data along with the imaging date and time data.

A regional data file 24 is also stored in the storage unit 21. The regional data file 24 is used to store regional data for specifying a region (hereinafter referred to as "culmination region") corresponding to a solar culmination time on the earth. For example, each piece of regional data is formed in a range of x degrees to y degrees of east longitude in order that the culmination region can be specified by the coordinate data of the geostationary satellite image data 1. Because the culmination region is changed with time, the regional data is specified by correlating each imaging date and time and the culmination region of the geostationary satellite image one by one. Therefore, a size of the region is set according to the imaging time interval of the geostationary satellite. Because generally the culmination time is changed by 4 minutes when the longitude is changed by 1 degree, the region corresponding to the culmination time is carved and determined in 15-minute unit that is the imaging time interval of the geostationary satellite in order to maximally enhance accuracy of the culmination time. As a result, a longitude range of 3 degrees 75 minutes can be determined as the region corresponding to the culmination time at a predetermined imaging time. Accordingly, the geostationary satellite image data 1 that is imaged at a date and time can be obtained by specifying the date and time based on the image database 2 and the regional data file 24, and the culmination region at the date and time can be specified in the geostationary satellite image data 1.

The arithmetic unit 22 produces land-surface image data by utilizing the data stored in the storage unit 21. As illustrated in FIG. 2, the arithmetic unit 22 includes production standard date setting means 11, standard image data obtaining means 12, image carving means 13, interpolated image data producing means 14, and image synthesizing means 15. For example, when a specific date is input from a keyboard and the like of the input unit 20, the production standard date setting means 11 sets the land-surface image corresponding a time point of the date to a production target. When not the specific date but a specific month is input, desirably the production standard date setting means 11 sets plural land-surface images corresponding to the time points of the dates included in the month to the production target.

Figure 3:
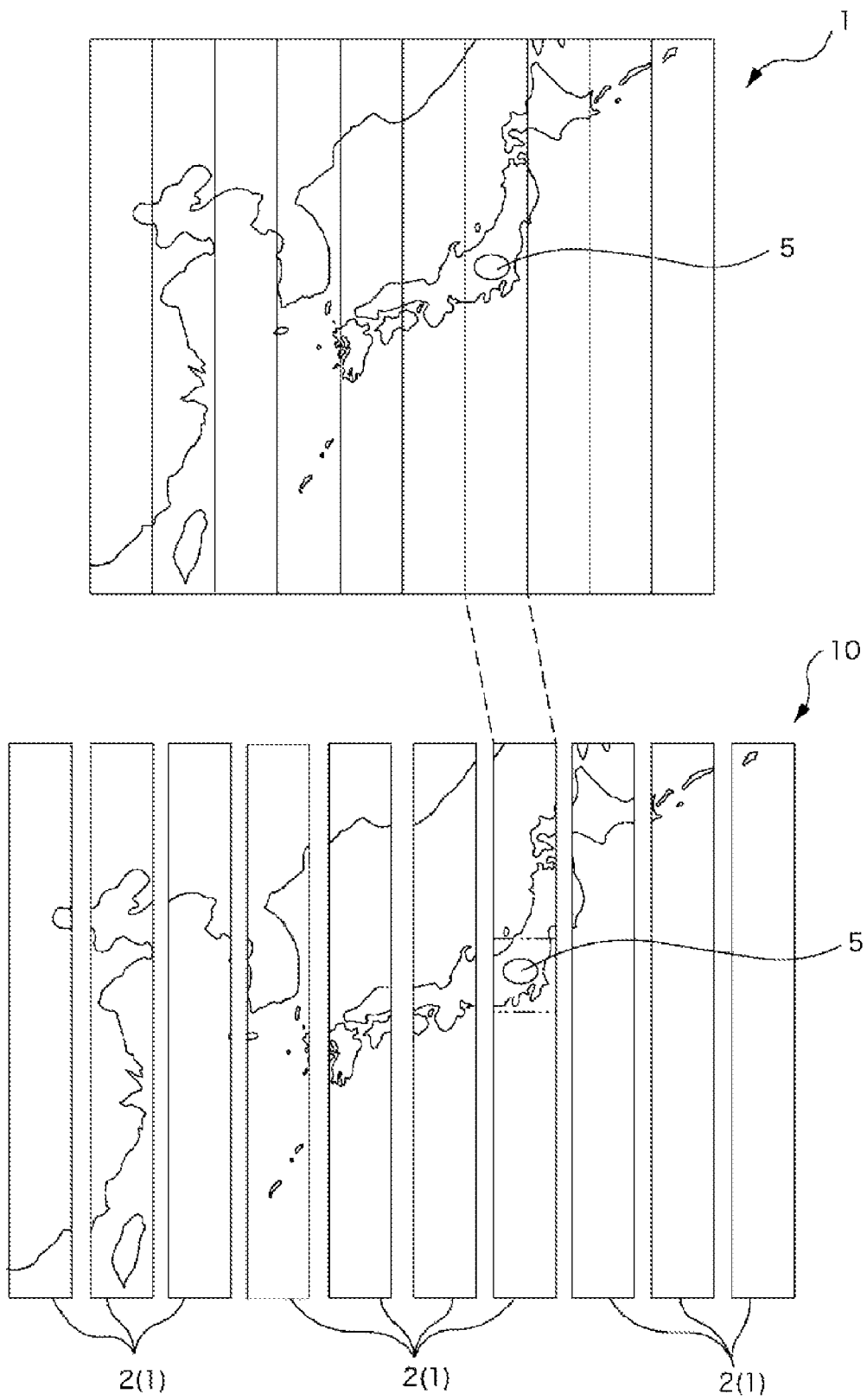
FIG. 3 is a view illustrating geostationary satellite image data including plural pieces of standard image data.
Figure 4:
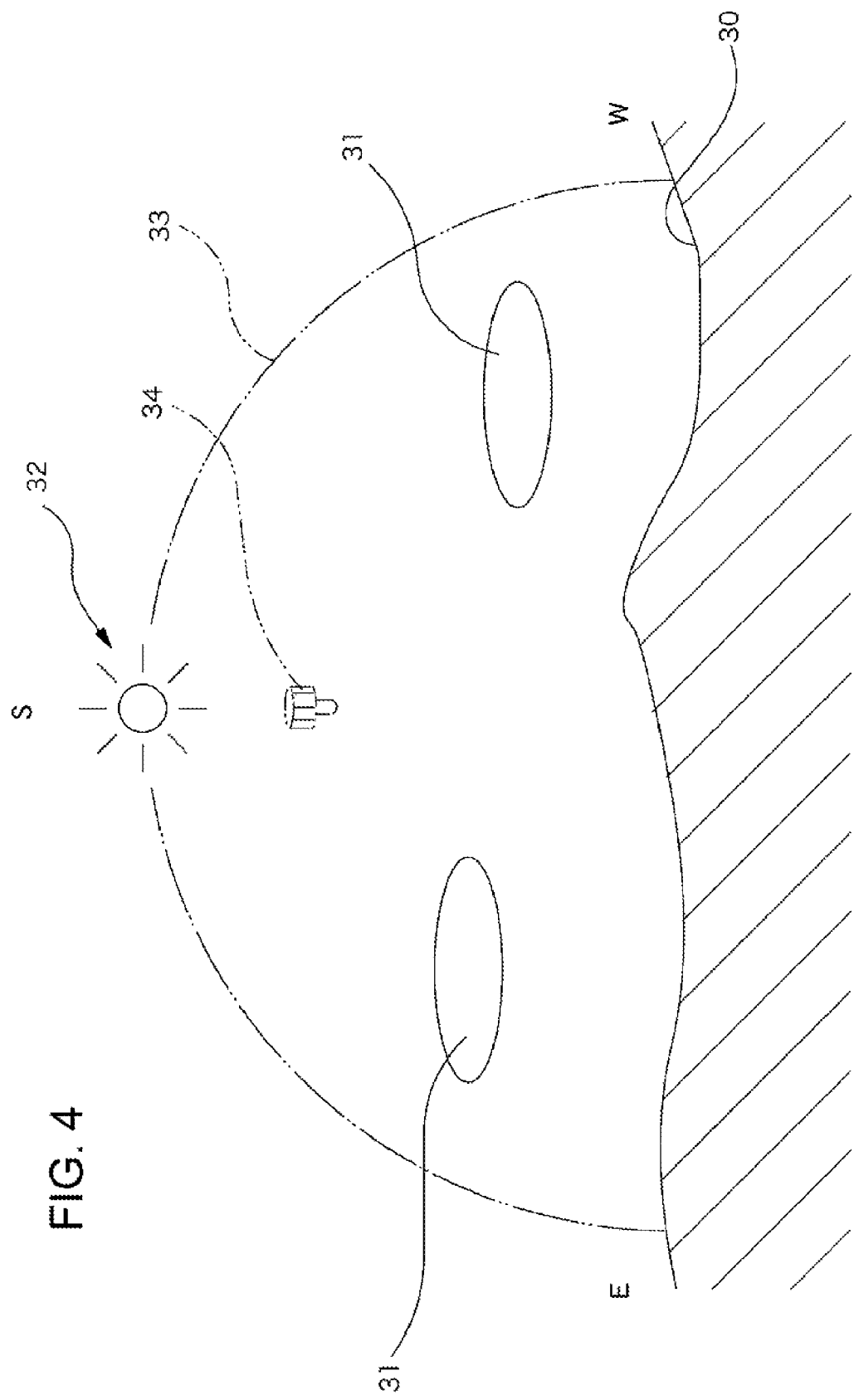
FIG. 4 is a view illustrating a state of a culmination time.

When the date is specified, the standard image data obtaining means 12 obtains standard image data 3 as a candidate of the land-surface image data representing the date with respect to the geostationary satellite image data 1 in which the culmination region is imaged at the date. Specifically, when the date is specified, the image database 2 is searched to specify the plural pieces of imaging date and time data belonging to the date, the plural pieces of geostationary satellite image data 1 corresponding to the pieces of imaging date and time data are specified, and the culmination region is specified on the geostationary satellite image data 1 at each imaging date and time by the regional data file 24. Therefore, pieces of image data concerning the culmination region can be carved from the pieces of geostationary satellite image data 1 including the culmination region and obtained as the standard image data 3. When the upper portion of FIG. 3 illustrates a whole of the imaging region of the geostationary satellite image data 1 stored in the image database 2, the standard image data 3 becomes each size in which the imaging region is divided by the longitude range of 3 degrees 75 minutes as illustrated in the lower portion of FIG. 3. The standard image data 3 in each longitude range is carved from the geostationary satellite image data 1 that is imaged at the timing at which the culmination region taken in the standard image data 3 is set to the culmination time, that is, the pieces of geostationary satellite image data 1 corresponding to the different pieces of imaging date and time data in the image database 2. The pieces of standard image data 3 are carved from the plural pieces of geostationary satellite image data 1 at the imaging date and time belonging to the specific date, and the pieces of carved standard image data 3 are arranged according to the coordinate information on the regional data. Therefore, as illustrated in FIG. 3, the whole region of geostationary satellite image data 1 includes the pieces of standard image data 3, in other words, enlarged standard image data 10 in which the plural pieces of standard image data 3 are coupled to one another can be obtained.

The image carving means 13 carves cloud image data 5 and land-surface image data 4 when the culmination image data includes the cloud image data 5. The image carving means 13 includes missing region setting means 25 that sets a region corresponding to the carved cloud image data 5 to a missing region 7. As with the conventional technique, the image carving means 13 performs the carving in units of pixels in such a manner that the pixel value is compared to the predetermined threshold to determine whether each pixel is the pixel reflecting the land surface 4 or the pixel reflecting the cloud 5, and the threshold is appropriately set by an experimental rule and the like. The carved pixel determined to be the land surface is stored as the partial image data 6, and the region corresponding to the pixel determined to be the cloud is set to the missing region 7 of the land-surface image by the missing region setting means 25.

The interpolated image data producing means 14 produces interpolated image data 9 that interpolates the missing region 7 set by the image carving means 13. The interpolated image data producing means 14 includes reference image data obtaining means 26 and interpolated region determining means 27. The reference image data obtaining means 26 obtains image data, which becomes a candidate to interpolate the missing region 7, as reference image data 8 from the image database 2. The reference image data 8 includes a region corresponding to the missing region 7 in the geostationary satellite image data 1 at the imaging date and time that is different from the imaging date and time of the standard image data 3. There is a possibility of the cloud in the region corresponding to the missing region 7 in the geostationary satellite image data 1 at the different imaging date and time. Therefore, the interpolated region determining means 27 sets the imaging date and time of the geostationary satellite image data 1 used to obtain the reference image data 8 such that the imaging date and time is sequentially changed according to a predetermined priority, until the missing region 7 of the standard image data 3 can completely be interpolated by the land-surface image. In the embodiment, roughly the priority is repeatedly set, such that a time around the imaging date and time of the standard image data 3 is set to a first priority, the same time around the date is set to a second priority, a time around the same time as well as around the date is set to a third priority, and the repetition in a similar manner around the date is set to a fourth priority. Specifically, for example, assuming that April 1st 12:00 is the imaging date and time of the standard image data 3, April 1st 11:45 is set to a first priority as the imaging date and time of the reference image data 8, April 1st 12:15 is set to a second priority, March 31st 12:00 is set to a third priority, April 2nd 12:00 is set to a fourth priority, March 31st 11:45 is set to a fifth priority, March 31st 12:15 is set to a sixth priority, April 2nd 11:45 is set to a seventh priority, April 2nd 12:15 is set to an eighth priority, March 30th 12:00 is set to a ninth priority, April 3rd 12:00 is set to a tenth priority, and so on.

When the reference image data 8 is obtained, as with the image carving means 13, the interpolated region determining means 27 compares the pixel value of the reference image data 8 to a predetermined threshold to determine whether each pixel is the pixel reflecting the land surface 4 or the pixel reflecting the cloud 5. The interpolated region determining means 27 stores the pixel determined to be the land surface as the interpolated image data 9 to release the setting of the missing region 7 concerning the pixel. The interpolated region determining means 27 maintains the setting of the missing region 7 concerning the pixel determined to be the cloud.

Accordingly, in the interpolated image data producing means 14, the reference image data obtaining means 26 obtains the reference image data 8 according to the missing region 7 set to the standard image data 3, and then the interpolated region determining means 27 determines whether each pixel is the pixel reflecting the land surface 4 for the obtained reference image data 8. The interpolated region determining means 27 stores the pixel determined to be the land surface 4 as the interpolated image data 9, and releases the setting of the missing region 7 in the standard image data 3 for the pixel. Therefore, the pixel set to the missing region 7 is released. The elimination of the missing region 7 means that the land-surface image data corresponding to the missing region 7 is obtained to complete the processing. When the missing region 7 remains, the reference image data obtaining means 26 obtains another piece of reference image data 8 for the remaining missing region 7, and then the interpolated region determining means 27 restocks the interpolated image data 9 and releases or maintains the setting of the missing region 7.

The image synthesizing means 15 synthesizes the partial image data 6 and the interpolated image data 9, interpolates the missing region 7 of the standard image data 3 with the interpolated image data 9, and produces the image data representing the specific date in the specific longitude range consisting only of land-surface image data. As described above, because the image data is obtained from each of the plural pieces of standard image data 3 whose regions are continued, the image synthesizing means 15 couples the pieces of image data according to the regional data to produce the coupled image data having the same size as the geostationary satellite image data 1. The thus produced image data is displayed on a monitor through the output unit 23.

The processing operation performed by a computer will be described with reference to FIG. 1. The production standard date setting means 11 sets the production standard date based on an input from the input unit 20 (Step S1), after which the standard image data obtaining means 12 obtains the culmination image data at the production standard date as the standard image data 3 according to the set production standard date (Step S2). As illustrated in FIG. 3, the standard image data 3 includes the plural pieces of image data whose regions are continued.

The image carving means 13 then stores the pixel, which is likely to express the land surface, as the partial image data 6 from each piece of standard image data 3, and the missing region setting means 25 sets the region on each piece of standard image data 3 corresponding to the pixel, which is likely to express the cloud, to the missing region 7 (Step S3). For each piece of standard image data 3 to which the missing region 7 is set, the reference image data obtaining means 26 obtains reference image data 8 from the region corresponding to the missing region 7 in the geostationary satellite image data 1 at the imaging date and time immediately before the imaging date and time. Then the interpolated region determining means 27 stores the pixel, which is likely to express the land surface, as the interpolated image data 9 from the obtained reference image data 8, and releases the setting of the missing region 7 of the corresponding pixel in the standard image data 3. Therefore, until the pixel set to the missing region 7 is eliminated in the standard image data 3, the imaging date and time of the reference image data 8 obtained by the reference image data obtaining means 26 is sequentially changed to repeat the processing performed by the interpolated region determining means 27, thereby producing the interpolated image data 9 in which the whole region of the missing region 7 of the standard image data 3 is filled up with the pixel likely to express the land surface (Step S4).

Figure 5:
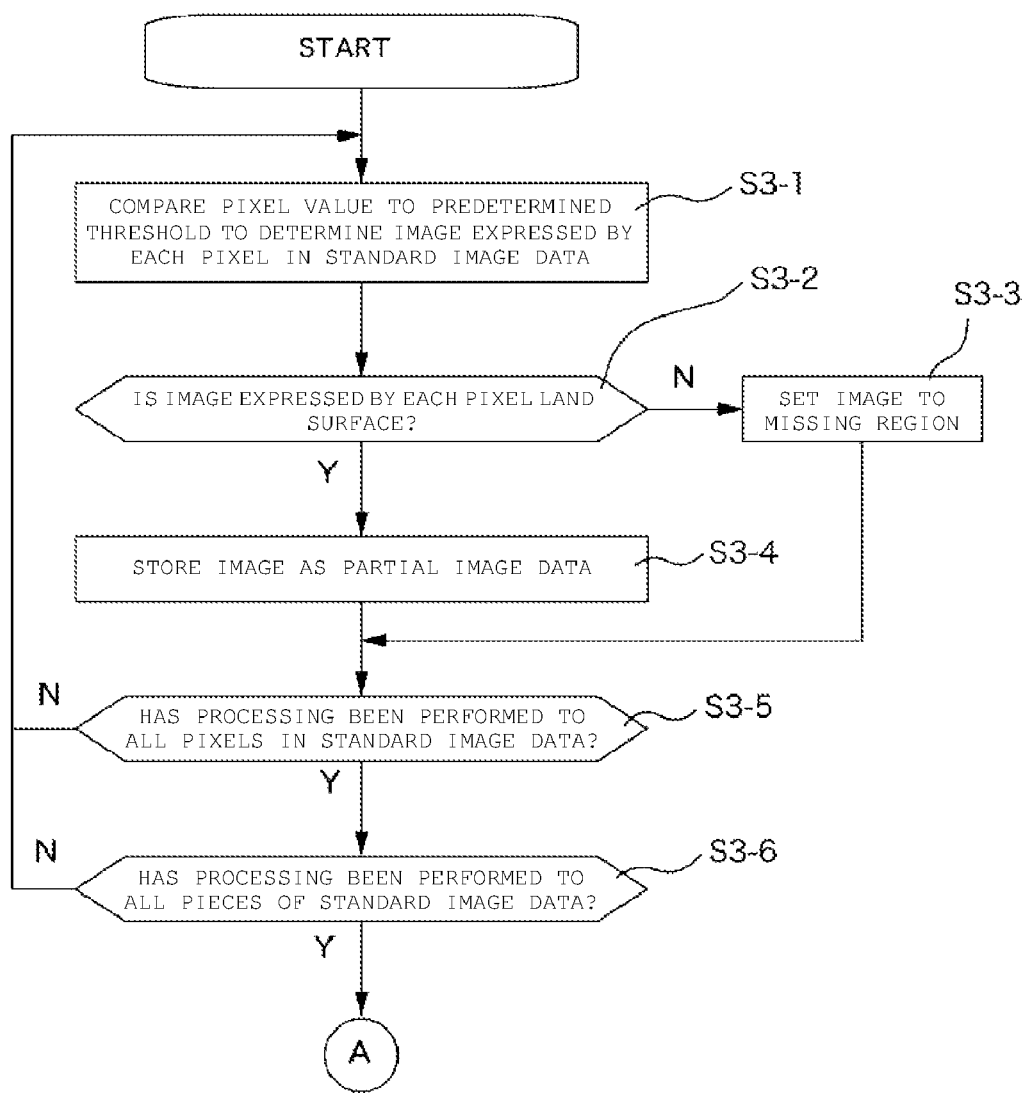
FIG. 5 is a detailed flowchart of a step for storing partial image data and setting a missing region.

The processing in Steps S3 and S4 will be described in detail with reference to FIGS. 5 to 7. In Step 3, for each piece of standard image data 3 obtained in Step 2, the pixel value is compared to the predetermined threshold to determine the image expressed by each pixel (Step S3-1), and a determination is made whether the image expressed by the pixel is the land surface (Step S3-2). When the image expressed by the pixel is not the land surface, the pixel is set to the missing region 7 (Step S3-3). On the other hand, when the image expressed by the pixel is the land surface 4, the pixel is stored as the partial image data 6 (Step S3-4). Then the processing in Steps S3-1 to S3-4 is performed to all the pixels in the standard image data 3 (Step S3-5), and performed to all the plural pieces of standard image data 3 (Step S3-6).

On the other hand, in Step S4, a confirmation whether the missing region 7 is set to each piece of standard image data 3 processed in Step S3 is made (Step S4-1). When the missing region 7 exists, the image data corresponding to the missing region 7 set to the standard image data 3 is obtained as the reference image data 8 from the geostationary satellite image data 1 at the last imaging date and time (Step S4-2). The last imaging date and time is initially set on the assumption that the solar position is close to the imaging date and time of the standard image data 3. For the reference image data 8, the pixel value is compared to a predetermined threshold to determine the image expressed by each pixel (Step S4-3), and a determination is made whether the image expressed by the pixel is the land surface (Step S4-4). When the image expressed by the pixel is not the land surface, the missing region 7 of the standard image data 3 corresponding to the pixel is maintained (Step S4-5). On the other hand, when the image expressed by the pixel is the land surface, the pixel is stored as the interpolated image data 9, and the setting of the missing region 7 of the pixel of the standard image data 3 corresponding to the pixel is released (Step S4-6). The processing in Steps S4-1 to S4-6 is performed to all the pixels in the reference image data 8 (Step S4-7). Then a determination is made whether the missing region 7 is eliminated from the standard image data 3 by releasing the setting of the missing region 7 to the pixel (Step S4-8). When the missing region 7 is not eliminated from the standard image data 3, the imaging date and time condition initially set in Step S4-2 is changed (Step S4-9), and the processing in Steps S4-2 to S4-7 is repeated. On the other hand, when the missing region 7 is eliminated from the standard image data 3, the processing for the standard image data 3 is ended, and the processing in Steps S4-1 to S4-9 is performed to all the pieces of standard image data 3 (Step S4-10).

Figure 7A:
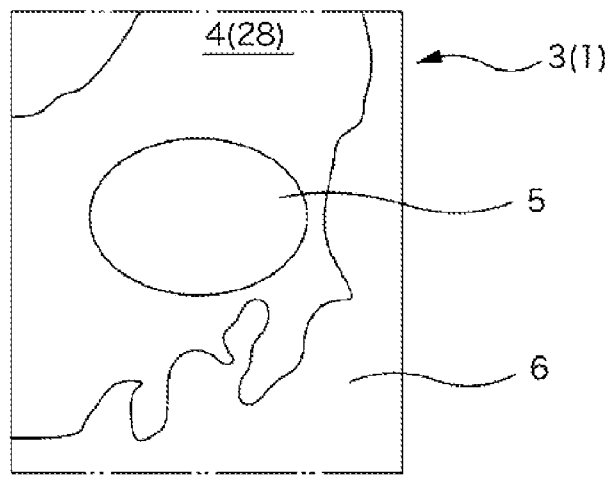
FIG. 7A illustrates a main part of the standard image data that corresponds to a region surrounded by an alternate long and two short dashes line of FIG. 3.
Figure 7B:
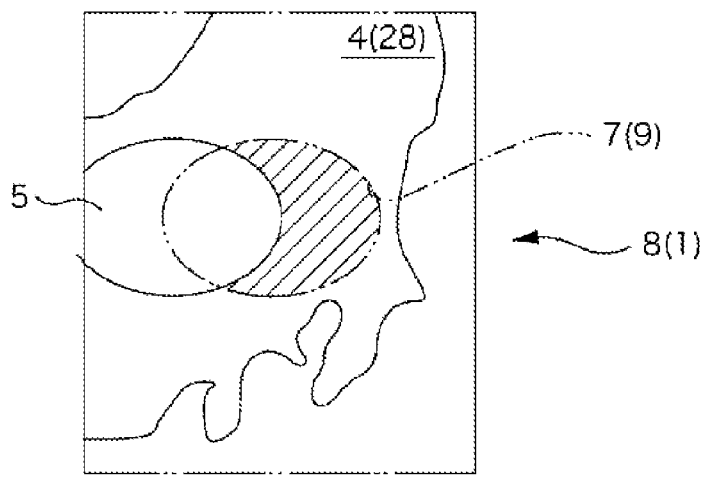
FIG. 7B illustrates a main part of the geostationary satellite image data in which the reference image data is obtained.
Figure 7C:
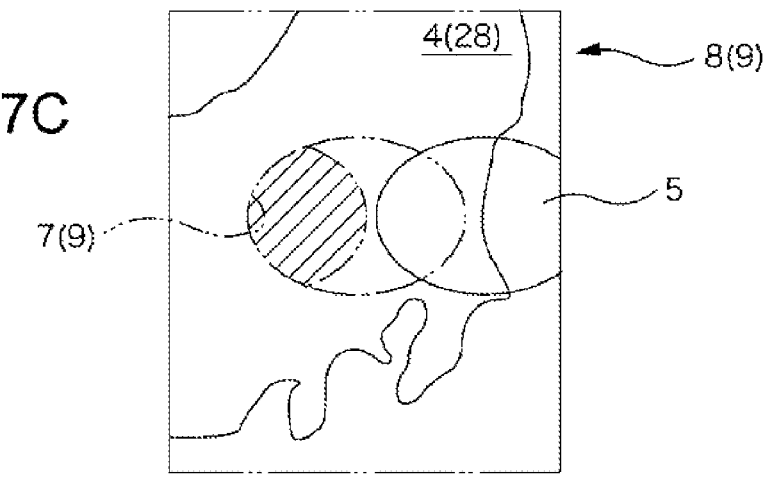
FIG. 7C illustrates the main part of the geostationary satellite image data in which another piece of reference image data is obtained.

FIG. 7 illustrates the state in which, as a result of the processing in Step S4-9, the missing region 7 is released by the reference image data 8 obtained from the geostationary satellite image data 1 that has the time lag of ±15 minutes with respect to the imaging date and time of the standard image data 3. FIG. 7A illustrates the standard image data 3, FIG. 7B illustrates the geostationary satellite image data 1 that is imaged 15 minutes before the standard image data 3 is imaged, and FIG. 7C illustrates the geostationary satellite image data 1 that is imaged 15 minutes after the standard image data 3 is imaged. In FIG. 7, the numeral 28 designates the land, and the numeral 5 designates the cloud. The region corresponding to the cloud is the missing region 7 in the standard image data 3 of FIG. 7A. In FIG. 7B, the hatched region in the missing region 7 is the land surface 4, and adopted as the interpolated image data 9. In FIG. 7C, the hatched region newly becomes the land surface, and is adopted as the interpolated image data 9.

When the processing in Steps S3 and S4 is ended, the image synthesizing means 15 synthesizes the produced interpolated image data 9 and the partial image data 6 to produce the synthesized image data including only the land-surface image data, and couples the plural pieces of synthesized image data produced in each of predetermined longitude ranges according to the regional data (Step S5). Then the processing operation is ended.

In the embodiment, the geostationary satellite image data 1 is imaged at intervals of 15 minutes. However, the time interval and the culmination region can appropriately be changed according to an imaging ability of the geostationary satellite image data 1 and the imaging time interval of the geostationary satellite image data 1 stored in the image database 2. The reduction scale of the image illustrated in the accompanying drawings is selected for the purpose of convenience, and the invention can be applied to the geostationary satellite image data 1 of the reduction scale that includes an object in the image.

EXPLANATION OF REFERENCE NUMERALS

1 Geostationary satellite image data
2 Image database
3 Standard image data
4 Image data reflecting land surface
5 Image data reflecting cloud
6 Partial image data
7 Missing region
8 Reference image data
9 Interpolated image data
10 Enlarged standard image data
11 Production standard date setting means
12 Standard image data obtaining means
13 Image carving means
14 Interpolated image producing means
15 Image synthesizing means

What is claimed is:

1. A land-surface image data producing method that is performed after a production standard date is set, the method comprising, successively:

referring to an image database that is stored while imaging date and time data is correlated with geostationary satellite image data and obtaining a predetermined region of the geostationary satellite image data at a predetermined time in the production standard date as standard image data;

comparing a pixel value and a predetermined threshold to determine whether each pixel of the standard image data reflects a land surface or a cloud, extracting a pixel that is determined to be the pixel reflecting the land surface and storing the pixel as partial image data, and setting a region on the standard image data specified by remaining pixels as a missing region;

referring to the image database to obtain image data as reference image data, the image data corresponding to the missing region in geostationary satellite image data of another imaging date and time, which is determined to be geostationary satellite image data having a close temporal relevance in a relationship between a solar position and the predetermined time at the production standard date according to a predetermined criterion, comparing a pixel value of each pixel of the reference image data to a predetermined threshold, determining whether the pixel value reflects the land surface or the cloud, repeating the processing by sequentially adding the another imaging date and time according to a predetermined priority until the missing region is filled up with the pixel determined to be the pixel reflecting the land surface, and producing interpolated image data that is formed by filling up the missing region with the pixel determined to be the pixel reflecting the land surface; and synthesizing the partial image data and the interpolated image data to produce land-surface image data.

2. The land-surface image data producing method according to claim 1, wherein regional data on the geostationary satellite image data is correlated with the imaging date and time data, the date and time being set to a culmination time in the geostationary satellite image data, and the standard image data is obtained by carving out a region corresponding to the regional data from the geostationary satellite image data.

3. The land-surface image data producing method according to claim 2, wherein the standard image data is obtained from a plurality of pieces of geostationary satellite image data based on the date data included in the imaging date and time data, the plurality of pieces of geostationary satellite image data are imaged at the production standard date, and enlarged standard image data is produced by correlating the standard image data according to the regional data, and the reference image data is obtained from the geostationary satellite image data of the imaging date and time for each piece of standard image data in which the missing region is set in the plurality of pieces of standard image data included in the enlarged standard image data, the geostationary satellite image data of the imaging date and time being determined to be geostationary satellite image data having a close temporal relevance in a relationship between the solar position and each imaging date and time of the standard image data according to a predetermined criterion.

4. The land-surface image data producing method according to claim 1, wherein a time that is closest to the imaging date and time of the standard image data is set to a first priority, the same time in a date that is closest to the imaging date of the standard image data is set to a second priority, and a time that is closest to the same time is set to a third priority.

5. A land-surface image data producing apparatus comprising:
- production standard date setting means for setting a production standard date;
- standard image data obtaining means for referring to an image database that is stored while imaging date and time data is correlated with geostationary satellite image data and obtaining a predetermined region of the geostationary satellite image data at a predetermined time in the production standard date as standard image data;
- image carving means for comparing a pixel value and a predetermined threshold to determine whether each pixel of the standard image data reflects a land surface or a cloud, extracting a pixel that is determined to be the pixel reflecting the land surface and storing the pixel as partial image data, and setting a region on the standard image data specified by remaining pixels as a missing region;
- interpolated image producing means for referring to the image database to obtain image data as reference image data, the image data corresponding to the missing region in geostationary satellite image data of another imaging date and time, which is determined to be geostationary satellite image data having a close temporal relevance in a relationship between a solar position and the predetermined time at the production standard date according to a predetermined criterion, comparing a pixel value of each pixel of the reference image data to a predetermined threshold, determining whether the pixel reflects the land surface or the cloud, repeating the processing by sequentially adding the another imaging date and time according to a predetermined priority until the missing region is filled up with the pixel determined to be the pixel reflecting the land surface, and producing interpolated image data that is formed by filling up the missing region with the pixel determined to be the pixel reflecting the land surface; and
- image synthesizing means for synthesizing the partial image data and the interpolated image data to produce land-surface image data.

* * * * *